(12) United States Patent
Aird et al.

(10) Patent No.: US 12,554,630 B2
(45) Date of Patent: *Feb. 17, 2026

(54) SYSTEM AND METHOD FOR TESTING APPLICATIONS

(71) Applicant: The Toronto-Dominion Bank, Toronto (CA)

(72) Inventors: Kevin Aird, Toronto (CA); Aayush Kathuria, Brampton (CA); Periyakaruppan Subbunarayanan, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 201 days.

This patent is subject to a terminal disclaimer.

(21) Appl. No.: 18/439,801

(22) Filed: Feb. 13, 2024

(65) Prior Publication Data

US 2024/0184690 A1 Jun. 6, 2024

Related U.S. Application Data

(63) Continuation of application No. 17/815,286, filed on Jul. 27, 2022, now Pat. No. 11,934,297.

(51) Int. Cl.
*G06F 11/3668* (2025.01)
*G06F 11/3698* (2025.01)

(52) U.S. Cl.
CPC ...... *G06F 11/3698* (2025.01); *G06F 11/3696* (2013.01)

(58) Field of Classification Search
CPC .................................................. G06F 11/3668
See application file for complete search history.

(56) References Cited

U.S. PATENT DOCUMENTS 5,590,347 A * 12/1996 D'Souza ............... G06F 9/44
709/221
8,949,410 B2 2/2015 Patel et al.
10,841,226 B2 11/2020 Mariappan et al.
11,228,643 B2 1/2022 Parekh et al.
(Continued)

FOREIGN PATENT DOCUMENTS

CN 109451052 A 3/2019

*Primary Examiner* — Jae U Jeon
(74) *Attorney, Agent, or Firm* — CPST Intellectual Property Inc.; Brett J. Slaney

(57) ABSTRACT

A system for testing applications is disclosed. The system includes one or more processors, one or more communications modules coupled to the one or more processors to enable communications between services provided by the system, and at least one memory coupled to the one or more processors. The at least one memory stores computer executable instructions to enable a plurality of virtualized test services, each virtualized test service at least in part emulating dependent server responses to application operations. The instructions enable a load-balancing service for communication with the plurality of virtualized test services, and test an application based on a load, by directing the application to interact with the plurality of virtualized test services that are available, while avoiding communicating with the dependent servers during testing. The load-balancing service balances the testing of the application between the plurality of virtualized test services that are available.

19 Claims, 10 Drawing Sheets

(56) References Cited

U.S. PATENT DOCUMENTS

| | | |
|---|---|---|
| 11,397,658 B1* | 7/2022 | Pang .................. G06F 11/3433 |
| 2009/0138956 A1* | 5/2009 | Schneider ............... H04L 67/63 |
| | | 726/12 |
| 2021/0141708 A1 | 5/2021 | Mathur et al. |
| 2022/0021738 A1 | 1/2022 | Patel et al. |

* cited by examiner

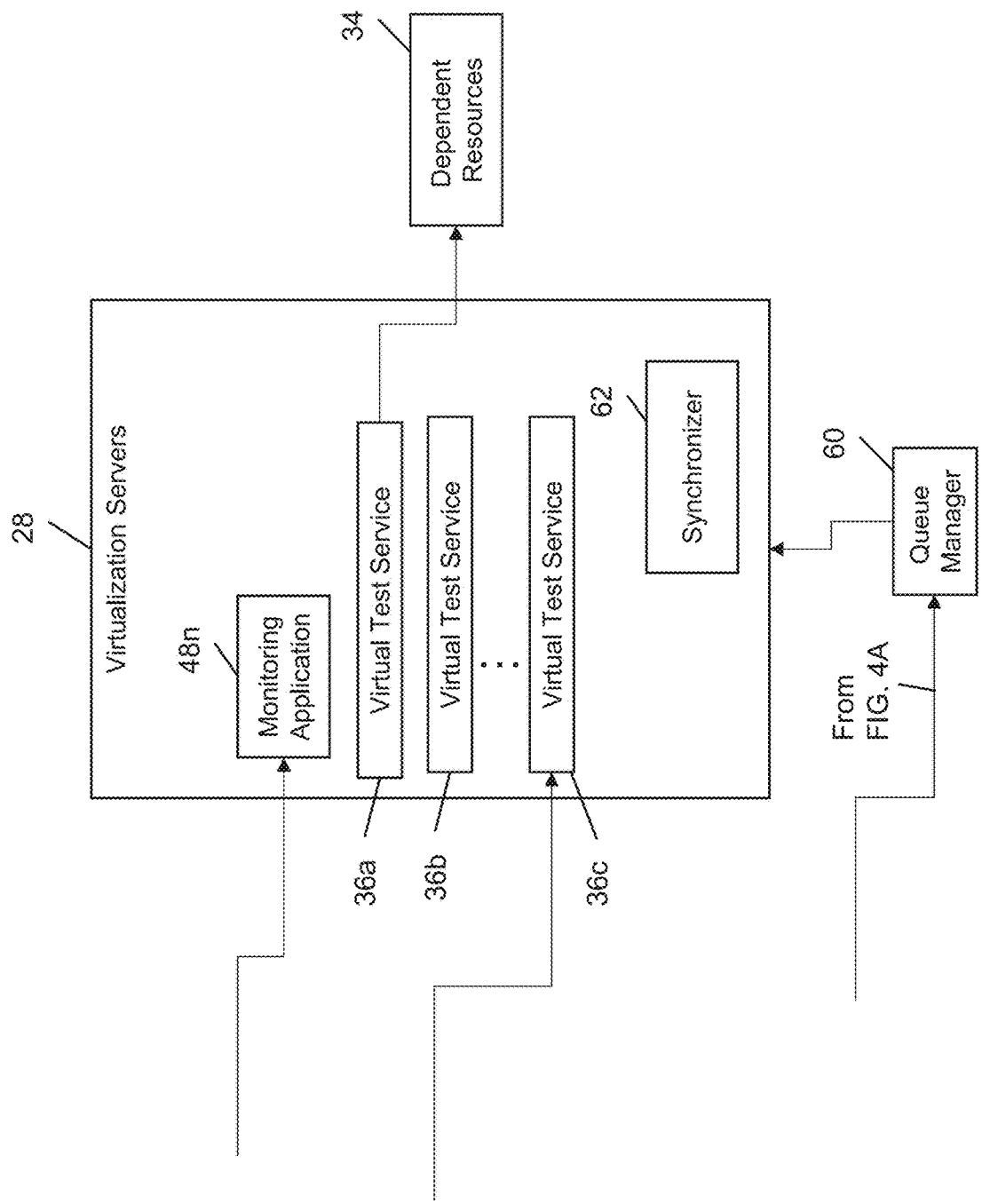

SYSTEM AND METHOD FOR TESTING APPLICATIONS

CROSS-REFERENCE TO RELATED APPLICATION(S)

This application is a Continuation of U.S. patent application Ser. No. 17/815,286 filed on Jul. 27, 2022, the contents of which are incorporated herein by reference in their entirety.

TECHNICAL FIELD

The following relates generally to software testing, and more specifically to managing resources to implement software testing.

BACKGROUND

Software testing can be difficult and expensive to develop and implement, and its complexity can also make it difficult and expensive to coordinate. In addition, the more software relies upon production resources, the greater the risk that the software testing can negatively impact existing products or existing related resources. For example, software testing can potentially rely upon physical infrastructures used to implement unrelated products, thereby potentially adversely impacting the unrelated products.

Software testing which is less expensive to implement, and/or easier to facilitate and/or coordinate is desirable.

BRIEF DESCRIPTION OF THE DRAWINGS

Embodiments will now be described with reference to the appended drawings wherein:

FIGS. 4A and 4B are diagrams illustrating operation of an example application testing environment.

DETAILED DESCRIPTION

Figure 1:
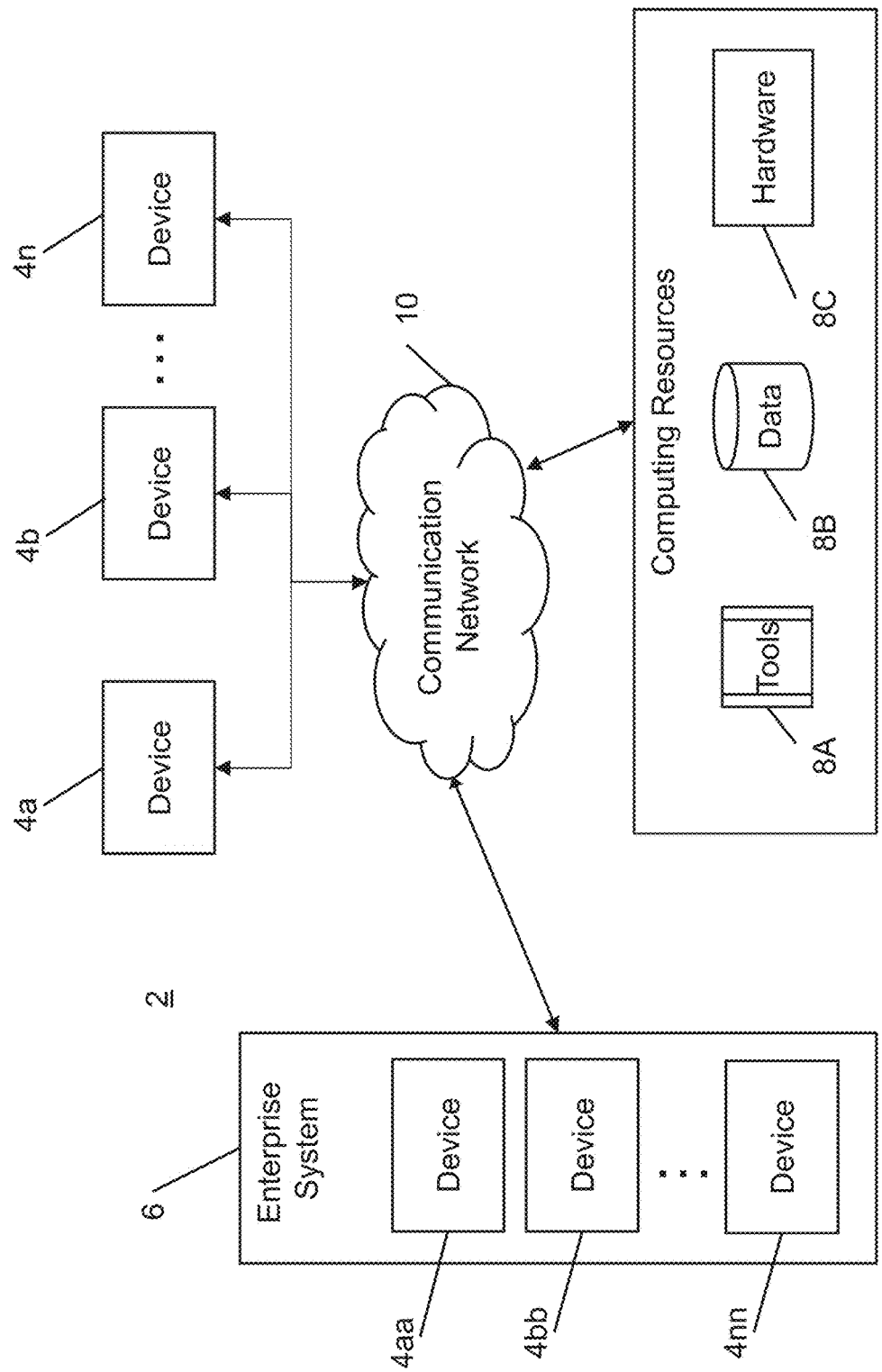
FIG. 1 is a block diagram of an example computing environment.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The following generally relates to testing software by directing the software to interact with a plurality of virtual test services that are available, while avoiding communicating with the dependent resources (i.e., resources which are intended to function for other than testing of the software under test and, e.g., another application which provides authentication) during testing. In this manner, the dependent resources, which can be used for production, are avoided, along with the potential negative impacts associated with misuse of same.

In at least one aspect, software can be tested with the plurality of virtualized test services, however only available virtual test services are used. This may allow for a framework to share and/or reuse virtual test services, which itself can encourage more robust and sophisticated virtual test services (e.g., as a result of revisions or additional training) and more generally allow for testing processes which improve over time (e.g., inefficient virtual test services can be removed in favor of new services).

Availability can be determined based on one or more parameters, such as a latency, a service type, a location, etc. In addition, the availability can be determined based on user input. For example, in a shared environment, the user input can remove certain test services (e.g., for re-training, for use, etc.) from availability for testing.

The following may allow for more effective testing by allowing for rapid recalibration of testing. For example, in instances where an increased load for testing is determined or anticipated (e.g., user input to increase testing load), a load-balancing server can be configured to load balance with an updated availability of the virtual test services without reconfiguring the testing. For example, the following can allow for user input to make previously unavailable virtual test services available, or create new instances of a virtual test service to facilitate the increased loading. This ability to scale and balance the virtual test services independent of dependent resources and testing reconfiguration can allow for quick and scalable testing regimes, where additional load testing feasibility can be assessed quickly, and resource allocation and testing can be performed quickly.

In one aspect, a system for testing applications is disclosed. The system includes one or more processors, and one or more communications modules coupled to the one or more processors to enable communications between services provided by the system. The system includes at least one memory coupled to the one or more processors, the at least one memory storing computer executable instructions. When executed, by the one or more processors, the instructions cause the one or more processors to enable a plurality of virtualized test services. Each virtualized test service at least in part emulates a dependent server response to application operations. The instructions cause the processor to enable a load-balancing service for communication with the plurality of virtualized test services. The instructions cause the processor to test an application based on a load, by directing the application to interact with the plurality of virtualized test services that are available, while avoiding communicating with the dependent servers during testing. The load-balancing service balances the testing of the application between the plurality of virtualized test services that are available.

In example embodiments, the instructions cause the one or more processors to enable a monitoring service to communicate with the load-balancing service. The monitoring service configures the load-balancing service with one or more parameters determining availability of the plurality of virtual testing services. In example embodiments, the one or more parameters determining availability include at least one of a latency of at least one of the plurality of virtualized testing services, a service type of the plurality of virtualized testing services, and a location of at least one of the plurality of virtualized testing services. In example embodiments, the monitoring service and the load-balancing service are each on separate dedicated servers relative to the plurality of virtualized test services that are available.

In example embodiments, the instructions cause the one or more processors to generate a user interface, via the monitoring service, for receiving input to manipulate the availability of the plurality of virtualized test services.

In example embodiments, the instructions cause the one or more processors to generate a user interface, via the monitoring service, for at least one of creating, deploying, and maintaining virtual test services.

In example embodiments, a configuration file for at least one of the plurality of virtualized test services is stored for subsequent testing.

In example embodiments, at least one of the plurality of virtualized test services is initialized with a pre-existing configuration file.

In example embodiments, the instructions cause the one or more processors to detect an increase in the load for testing of the application, and determine the availability of the plurality of virtualized test services. The instructions cause the processor(s) to re-balance the testing of the application between the plurality of virtualized test services that are available, based on the increased load. In example embodiments, the increase in the load is detected during an ongoing test of the application.

In example embodiments, at least one of the plurality of virtualized test services is configured during a training period based on responses from the dependent servers to the application.

In example embodiments, the monitoring service aggregates performance information from the plurality of virtual test services for consumption, and wherein the monitoring service displays the aggregated information.

In another aspect, a method for testing applications is disclosed. The method includes providing a plurality of virtualized test services, each test service at least in part emulating dependent server responses to application operations. The method includes providing a load-balancing service in communication with the plurality of virtualized test services. The method includes performing a test of an application based on a load, the application interacting with the plurality of virtualized test services that are available, in place of dependent servers. The method includes balancing the testing, with the load-balancing service, of the application between the plurality of virtualized test services that are available.

In example embodiments, the method further includes configuring the load-balancing service, via a monitoring service in communication with the load-balancing service, with one or more parameters determining availability of the plurality of virtual testing services.

In example embodiments, one or more parameters determining availability comprise at least one of a latency of at least one of the plurality of virtualized testing services, a service type of the plurality of virtualized testing services, and a location of at least one of the plurality of virtualized testing services.

In example embodiments, the monitoring service and the load-balancing service are each on separate dedicated servers relative to the plurality of virtualized test services that are available.

In example embodiments, the method further includes generating a user interface, via the monitoring service, for receiving input to manipulate the availability of the plurality of virtualized test services.

In example embodiments, the method further includes generating a user interface, via the monitoring service, for at least one of creating, deploying, and maintaining virtual test services.

In example embodiments, the method further includes detecting an increase in the load for testing of the application. The method includes determining the availability of the plurality of virtualized test services, and re-balancing the testing of the application between the plurality of virtualized test services that are available, based on the increased load.

In another aspect, a non-transitory computer readable medium for testing applications is disclosed. The computer readable medium includes computer executable instructions for providing a plurality of virtualized test services, each test service at least in part emulating dependent server responses to application operations. The instructions are for providing a load-balancing service for communication with the plurality of virtualized test services. The instructions are for performing a test of an application based on a load, the application interacting with at the plurality of virtualized test services that are available, in place of dependent servers. The instructions are for balancing the testing, with the load-balancing service, of the application between the plurality of virtualized test services that are available.

Referring now to FIG. 1, an exemplary computing environment 2 is illustrated. In the example embodiment shown, the computing environment 2 includes an enterprise system 6, one or more devices 4 (shown as devices 4*a*, 4*b*, . . . 4*n*, external to the enterprise system 6, and devices 4*aa*, 4*bb*, and 4*nn*, internal to the enterprise system 6), and a remote computing environment 8 (shown individually as tool(s) 8A, database(s) 8B, and hardware 8C). Each of these components can be connected by a communications network 10 to one or more other components of the computing environment 2. In at least some example embodiments, all of the components shown in FIG. 1 can be provided/executed within the enterprise system 6.

The one or more devices 4 may hereinafter be referred to in the singular for ease of reference. An external device 4 can be operated by a party other than the party which controls the enterprise system 6; conversely, an internal device 4 can be operated by the party in control of the enterprise system 6. Any device 4 can be used by different users, and with different user accounts. For example, the internal device 4 can be used by an employee, third party contractor, customer, etc., as can the external device 4. The user may be required to be authenticated prior to accessing the device 4, the device 4 can be required to be authenticated prior to accessing either the enterprise system 6 or the remote computing environment 8, or any specific accounts or resources within computing environment 2.

The device 4 can access information within the enterprise system 6, communications network 10, or remote computing environment 8 in a variety of ways. For example, the device 4 can access the enterprise system 6 via a web-based application, or a dedicated application, an application capable of interacting with the enterprise module 104 of FIG. 8, etc. Access can require the provisioning of different types of credentials (e.g., login credentials, two factor authentication, etc.). In example embodiments, each different device 4 can be provided with a unique degree of access, or variations thereof. For example, the internal device 4 can be provided with a greater degree of access to the enterprise system 6 as compared to the external device 4.

Devices 4 can include, but are not limited to, one or more of a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 10 shown by way of example in FIG. 1.

The remote computing environment 8 (hereinafter referred to in the alternative as computing resources 8) includes resources which are stored or managed by a party other than operator of the enterprise system 6 and are used by, or available to, the enterprise system 6. For example, the computing resources 8 can include cloud-based storage services (e.g., database(s) 8B). In at least some example embodiments, the computing resources 8 include one or more tools 8A developed or hosted by the external party, or tools 8A for interacting with the computing resources 8. In at least one contemplated embodiment, the tool 8A (referred to in the singular for ease of reference) is a tool for monitoring hardware 8C performance. The tool 8A can be or include aspects of a machine learning tool. The computing resources 8 can also include hardware resources 8C, such as access to processing capability of server devices (e.g., cloud computing), and so forth.

Communication network 10 may include a telephone network, cellular, and/or data communication network to connect distinct types of client devices. For example, the communication network 10 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 10 may not be required to provide connectivity within the enterprise system 6 or the computing resources 8, or between devices 4, wherein an internal or other shared network provides the necessary communications infrastructure.

The computing environment 2 can also include a cryptographic server or module (not shown) for performing cryptographic operations and providing cryptographic services (e.g., authentication (via digital signatures), data protection (via encryption), etc.) to provide a secure interaction channel and interaction session, etc. The cryptographic module can be implemented within the enterprise system 6, or the computing resources 8, or external to the aforementioned systems, or some combination thereof. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications carried out by the enterprise system 6 or device 4. The cryptographic server may be used to protect data within the computing environment 2 (e.g., including data stored in database(s) 8B) by way of encryption for data protection, digital signatures or message digests for data integrity, and by using digital certificates to authenticate the identity of the users and entity devices with which the enterprise system 6, computing resources 8, or the device 4 communicates, to inhibit data breaches by adversaries. It can be appreciated that various cryptographic mechanisms and protocols can be chosen and implemented to suit the constraints and requirements of the computing environment 2, as is known in the art.

The enterprise system 6 can be understood to encompass the whole of the enterprise, a subset of a wider enterprise system (not shown), such as a system serving a subsidiary or a system for a particular branch or team of the enterprise (e.g., a software development or testing division of the enterprise). In at least one example embodiment, the enterprise system 6 is a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

Figure 2:
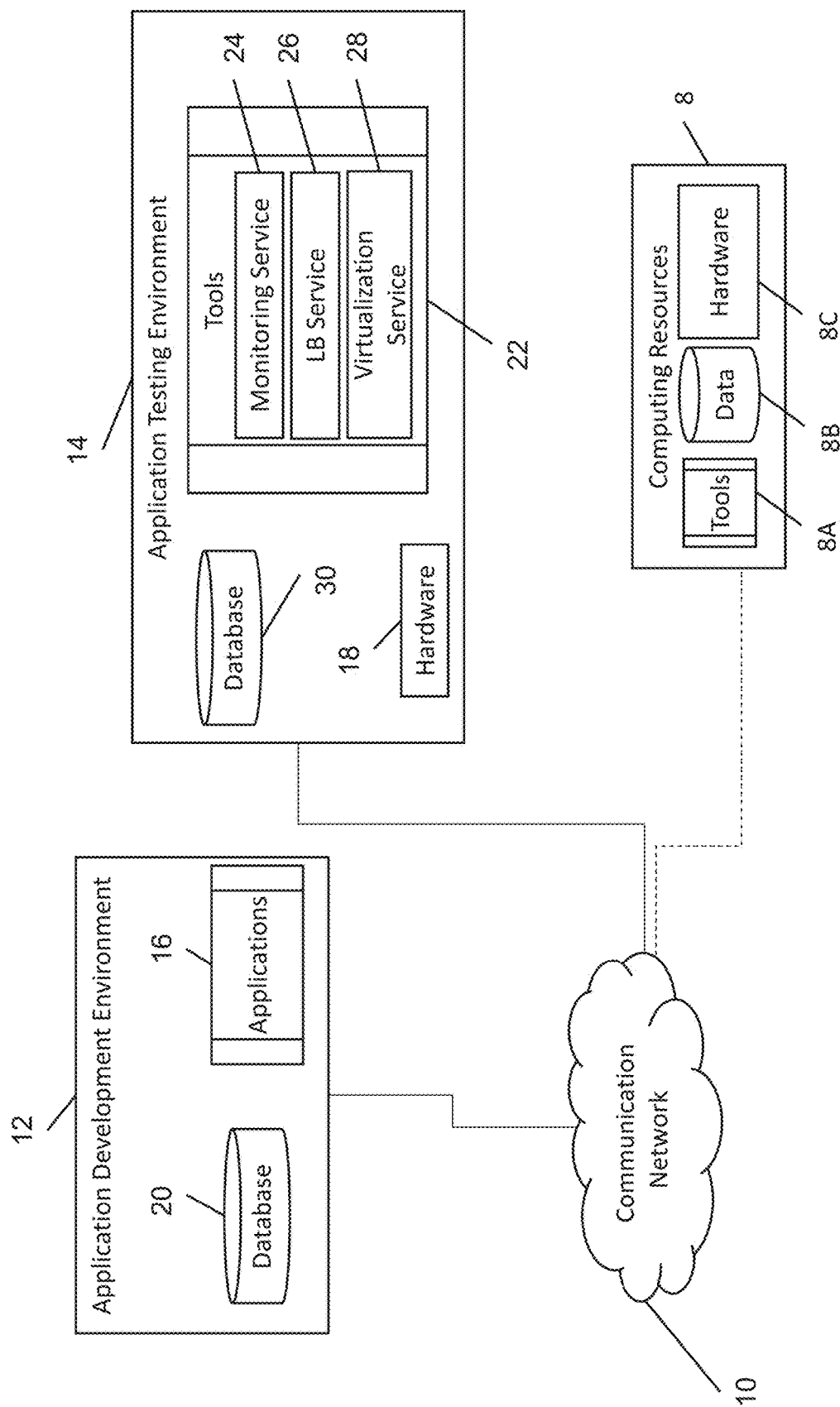
FIG. 2 is a schematic diagram of an example computing environment for software testing.

Referring now to FIG. 2, a schematic diagram of an example computing environment for testing applications is shown.

The computing environment includes an application development environment 12, and an application testing environment 14. The application development environment 12, and the application testing environment 14 can be in communication with one another via the communications network 10, or another internal network (not shown). In at least some contemplated example embodiments, either the application development environment 12, or the application testing environment 14, are in communication with, or rely upon, the computing resources 8 to perform their functionality as outlined herein. In the shown embodiment, it is understood that the application development environment 12 and the application testing environment 14 are within the enterprise system 6. However, this disclosure contemplates a variety of different configurations, including the application testing environment 14 being hosted at least in part remotely, e.g., on the computing resources 8, or otherwise.

The application development environment 12 includes one or more application(s) 16 (hereinafter referred to in the singular, for ease of reference) for testing. These applications 16 may be existing applications with certain updated functionalities, or the application 16 can be a new application, etc.

The application 16 includes at least one functionality that requires interaction with one or more resources extraneous to the application 16 (hereinafter referred to as dependent resources). For example, the application 16 can include a button to open a link to another related application of the enterprise system 6 (e.g., a banking application can include a link to an investment platform also provided by the commercial bank, which investment platform is hosted by a dependent server). The functionality which is dependent upon resources extraneous to the application 16 can be performed by any resource of enterprise system 6, generally, including the shown hardware 18 of the application testing environment 14, performed by resources external to the enterprise system 6 (e.g., performed on the hardware 8C of the computing resources 8), or more generally performed by computing resources controlled by or in the service of the enterprise system 6 for the purpose of testing the application 16.

The application development environment 12 can also include a database 20 which stores information related to the application 16, metadata related to the testing of the application 16 (e.g., virtualized test service configurations, as described herein, metadata related to the testing, such as users capable of initiating tests, to whom test results are transmitted to, application 16 related data, such as identifying data including a build number, etc.). The database 20 includes the tests to be performed on the application 16, and any information required to implement the testing. For example, the database 20 can include scheduling information related to the testing, etc.

The application testing environment 14 includes the hardware 18, and one or more tools 22 (hereinafter referred to in the plural, for ease of reference). In the shown embodiment, the tools 22 include a monitoring service 24 for monitoring testing of the application 16 and for monitoring the application testing environment 14, a load-balancing service 26 for managing virtual test services related to testing of the application 16, and a virtualization service 28 for generating virtual test services to emulate functionality of dependent resources, including emulating the functionality of hardware 18.

The application testing environment 14 can also include a database 30, for storing information to enable application testing. For example, the database 30 can store one or more configurations or files that enable a virtualized test service (alternatively referred to as a virtual test service) to emulate the dependent resources. Further particularizing the example, the database 30 can include a file containing a list of rules that specify the response of the virtual test service depending on requests received by that service from the application 16 under test.

Figure 3:
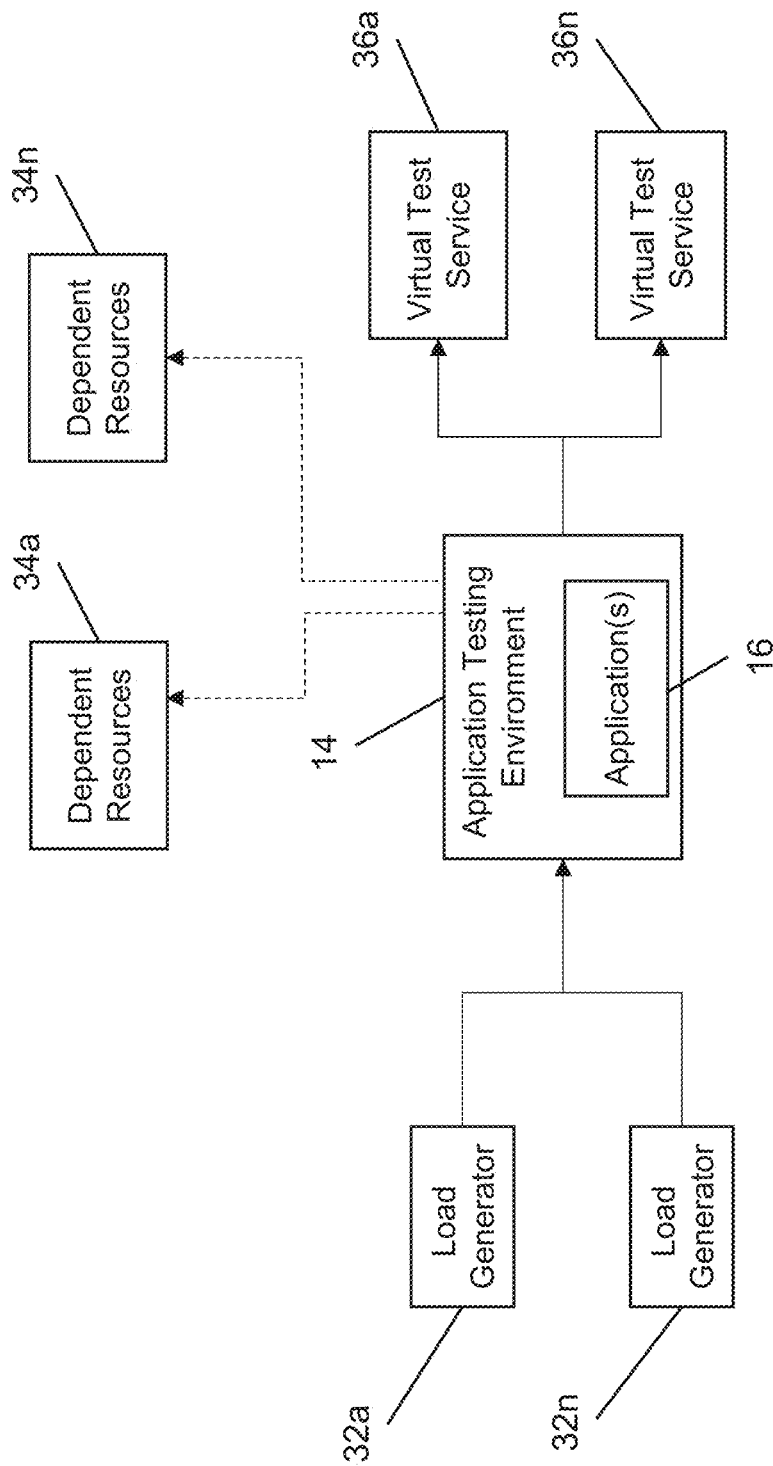
FIG. 3 is a diagram of an example flow for application testing.

Referring now to FIG. 3, a block diagram of a system for testing applications with virtualized testing services is shown. The application 16 is loaded or otherwise provided to the application testing environment 14. One or more load generators 32, denoted by load generators 32a to 32n, are used to generate loads to simulate operation of the application 16. For example, the load generators 32 can generate a series of inputs mimicking the operation of the application 16 by a user. In example embodiments, the application 16 is a banking application for a mobile device, having a user interface (UI). The load generators 32 can generate a plurality of inputs mimicking a user navigating through various screens of the UI (e.g., swiping actions to move between panels of the UI, clicking on a button such as a deposit button, etc.).

At least one of the inputs provided by the load generators 32 is intended to trigger or invoke functionality of the dependent resources 34, denoted by dependent resources servers 34a to 34n. The triggering inputs model scenarios the application 16 experiences during production, including likely user errors. For example, the use of the banking application 16 can include a functionality that triggers method calls to retrieve information from an investing platform, which can be stored on a server comprising the dependent resources 34.

To avoid the dependent resources 34, one or more virtual test services 36 (denoted by virtual test services 36a to 36n) are generated by the virtualization service 28 to emulate the functionality of the dependent resources 34. The dependent resources 34 are desirable to avoid for a number of reasons, including, but not limited to, avoiding unintended consequences associated with interacting with dependent resources 34 (e.g., another application can rely upon the dependent resources 34, and use of the dependent resources 34 for application testing can unacceptably impact the other applications, etc.), to avoid expense and resources associated with establishing separate dependent resources 34 solely for the application 16 test, to avoid the expense and resources associated with implementing and maintaining integration with the dependent resources 34 for different tests, and so forth. Particularizing an example virtual test service 36, where the dependent resources 34 provide access to financial data from an investing platform segregated from the application 16, the virtual test service 36 can be configured to provide a sample set of investing data to facilitate the testing of the application 16 in the application testing environment 14, without invoking the dependent resources 34.

The virtual test service 36 can be a single purpose virtual test service 36, or each virtual test service 36 can be used to emulate multiple functionalities of the dependent resources 34. Moreover, the virtual test service 36, or configuration data allowing for the implementation of the virtual test service 36, can be stored and saved for later use. It is noted that, for visual clarity, the virtual test services 36 are shown as being separate from the testing environment 16. In example embodiments, the virtual test service 36 is within the application testing environment 16 (e.g., in a configuration file stored on the database 30), or in example embodiments, at least part of the virtual test service 36 is stored external to the application testing environment 14 (e.g., a configuration file for the virtual test service 36 is stored on a dedicated server for persisting virtual services (not shown)).

During a training period, the application testing environment 16 can be configured to communicate with the dependent resources 34 to determine a configuration of the virtual test service 36. The virtual test service 36 can be configured in a variety of manners, including, for example, to respond with synthetic or meaningless data (e.g., responses are investing data in a particular format), to respond in a particular format, to respond based on responses the dependent resource 34 would offer in response to a query from the application 16 (e.g., an investing platform responds to requests that authentication is required, access is granted, etc.). The configuration can be determined based on preliminary test of the application 16 with interactions with the dependent resources 34. The responses to the operations of the application 16 by the dependent resources 34 are sampled to configure virtual test services 36. The virtual test service 36 can thereafter be configured to respond based on the collected responses (e.g., randomly select an answer, such as a temperature, or based on a set of rules, such as providing responses in the frequency of their expected occurrence, etc.).

Figure 4A:
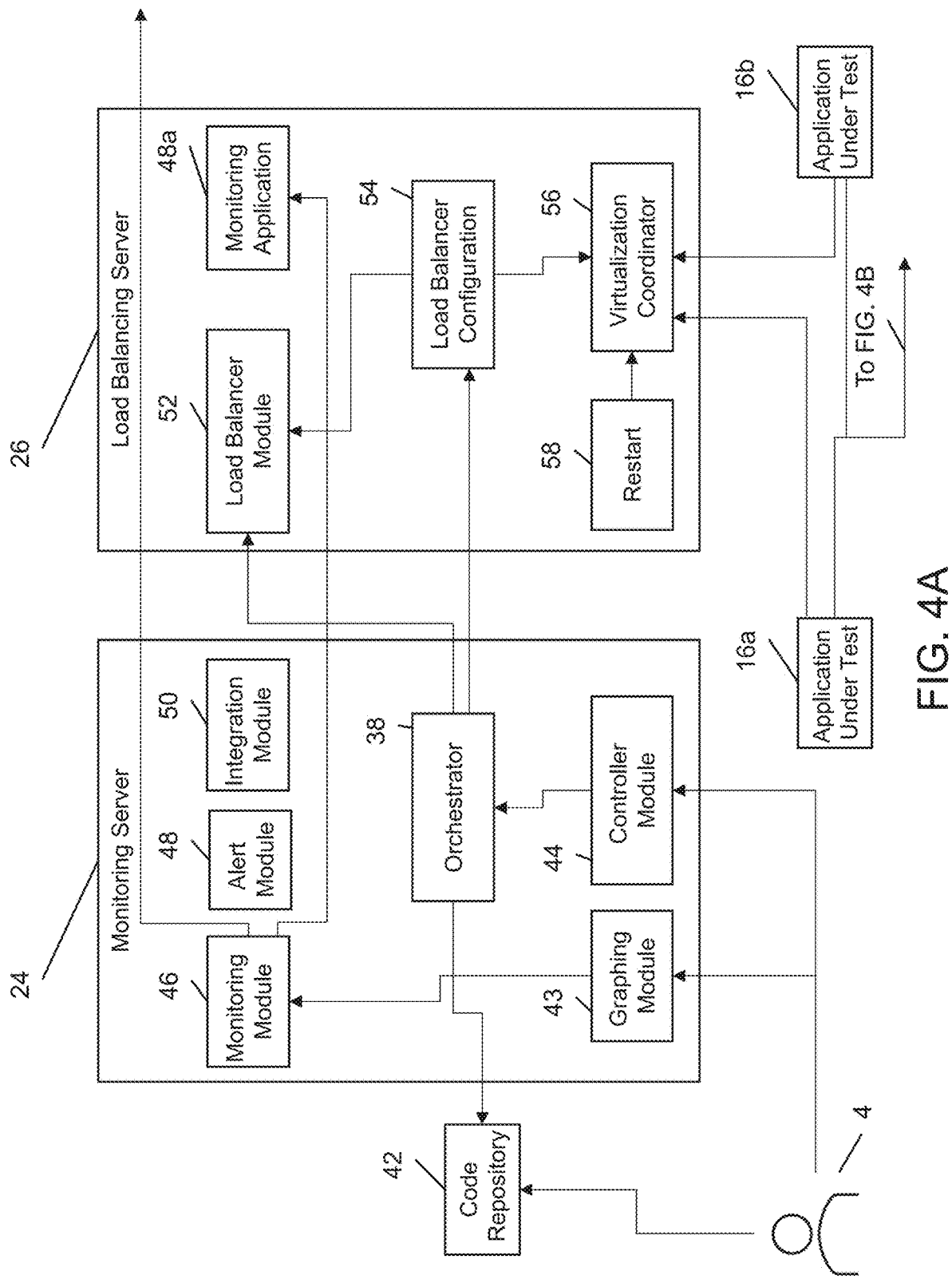

Referring now to FIGS. 4A and 4B, a schematic diagram of an example system for testing applications is shown.

In the shown embodiment, the functionality of the monitoring service 24 is performed by a dedicated monitoring server (hereinafter referred to interchangeably as monitoring service 24, solely for ease of reference), as is the functionality of the load-balancing service 26 (hereinafter referred to interchangeably as load-balancing service 26, solely for ease of reference). One or more servers, separate from the monitoring service 24 and the load-balancing service 26, may be used to provide the functionality of the virtualization service 28 and/or the virtual test services 36. Different servers can be used for the different services to ensure performance, and in particular the load-balancing service 26. For example, as will be discussed herein, in example embodiments where the virtual test services 36 are manipulated (e.g., additional virtual test services 36 created) to facilitate increased load testing, the load-balancing service 26 can be overwhelmed if executed by the same server as the monitoring service 24 (or vice versa), precluding a scalable testing process.

The monitoring service 24 includes an orchestrator 38 to enable a user device 4 (denoted by the image of a user in FIG. 4A), to interact with or manipulate the load-balancing service 26. Different builds or tools of the monitoring service 24 (e.g., the orchestrator 38) can be stored in a code repository 42, to enable configuring a server as a monitoring server, or to store knowledge of server operations between iterations of monitoring services 24. For example, an orchestrator 38 may be used with different load-balancing services 26, but benefit from updated integration (e.g., application programming interface (API)) modules.

The orchestrator 38 can receive one or more preferences, for example, from a user device 4, via a controller module 44, and can manipulate or configure at least one aspect of the load-balancing service 26 or the virtualization service 28 in accordance with the input preferences. For example, the controller module 44 can include a user interface (UI) that displays information generated or gathered by the monitoring service 24 (e.g., including graphical information generated by the graphing module 43), and allows input of the one or more preferences.

The orchestrator 38 can be configured to receive one or more preferences for creating, deploying, and maintaining virtual test services 36. For example, the preferences can be for storing a particular virtual test service 36 for subsequent testing (e.g., where the virtual test service 36 proved effective) in the form of a pre-existing configuration file, or by persisting the virtual test service, or for removing a virtual test service 36 from testing, or for generating virtual test services 36 (e.g., create a new virtual test service, or duplicate an existing virtual test service 36).

The one or more preferences can include parameters related to the virtualized test service 36 availability. For example, the orchestrator 38 (e.g., via controller module 44) can receive input parameters defining virtualized test service 36 availability, such as: a minimum latency to be deemed to be available, a service type of virtual test services 36 (e.g., the protocol used by the virtual test service 36, where protocols which are unnecessary to the testing of the application 16 are deemed unavailable, etc.), a location of the virtual test services 36 (e.g., virtual test services 36 can be used by a plurality of groups, and virtual test services 36 stored on a shared host can be provided with a lower priority relative to a dedicated service), a capacity of the virtual test service 36 (e.g., an example virtual test service 36 that has 15 different response types can simultaneously provide 15 responses, as compared to a virtual test service 36 with a single response). In another example, the orchestrator 38 can receive input preferences defining which of similar virtual test services 36 are to be used for testing. This can help manage virtual test services 36 in a large organization with a plurality of virtual test services 36. In yet another example, the controller module 44 can receive input that defines existing and available virtual test services 36 as unavailable (e.g., where the service 36 is anticipated to be used elsewhere, or to implement testing, etc.).

The monitoring service 24 includes a monitoring module 46, in communication with related monitoring applications on the load-balancing server 26 and the virtualization servers 28 (i.e., the shown monitoring applications 46A, 46B).

The monitoring module 46 can be in communication with at least one of the orchestrator 38, controller module 44, or other module which interfaces with the user device 4 to provide real-time, near-real-time, or delayed information as to the operation of the load-balancing server 26 and/or the virtual test services 36. It is noted that the connection between the monitoring module 46 and the aforementioned elements of monitoring server 24 are not shown, to maintain visual clarity.

The monitoring service 24 includes an alert module 48. The alert module 48 can, with information provided by the monitoring module 46, implement one or more rules for triggering alerts. For example, the alert module can have stored thereon rules determining when certain notifications are provided to the user device 4 (e.g., via the controller module 44), the type of alert provided, and the substance of the alert (e.g., a text element, a graphical element, etc.). In at least some contemplated embodiments, the rules of the alert module are configurable by the user device 4 through the controller module 44.

The monitoring service 24 includes an integration module 50. The integration module 50 facilitates integration between the monitoring service 24, the load-balancing service 26, and the virtualization service 28. For example, integration module 50 can include APIs to facilitate the services operation according to continuous integration and continuous delivery principles.

The integration module 50 can also facilitate creating, deploying, and/or maintaining the virtual test services 36 or virtualization service 28. For example, configurations of the virtual test services 36 can be stored in a central repository (e.g., database 30), and the integration module 50 can periodically check the database 30 to determine if there are updated virtual test services 36 available. Similarly, the integration module 50 can maintain a record of where the virtual test services 36 are hosted (e.g., virtual test services 36 can be executed on different hosts based on availability) and update the monitoring service 24 with any changes. The integration module 50 can also monitor capacity of server hardware responsible for implementing the virtual test services 36 to determine if additional capacity is available to deploy another instance of the virtual test services 36.

The load-balancing service 26 includes a load balancer module 52 to automate the load sent to each of the virtual test services 36. For example, during testing of the application 16, each different input from the load generators 32 can include multiple calls to a particular virtual test service 36, and the load balancer module 52 can automatically balance the load between the available virtual test services 36. In at least some contemplated example embodiments, the load balancer module 52 balances the load on the virtual test services 36 while incorporating any input from the user device 4 via a load balancer configuration 54.

The load balancer configuration 54 can include one or more rules used to configure the load balancer module 52 during operation. The one or more rules can be defined based on the availability of the virtual test services 36, or other input. The rules can specify an order of operations of testing (e.g., certain virtual test services 36 are tested first), a capacity of the virtual test services 36 (e.g., the load balancer module 52 can be instructed to ignore certain instances of the virtual test services 36 if the capacity is unsatisfactory), and other parameters related to the operation of the virtual test services 36 (e.g., the frequency of reporting to the monitoring application), etc.

In at least some example embodiments, the load balancer configuration 54 communicates with the virtualization coordinator 56 to generate additional capacity (e.g., instantiate a new virtual test service 36), or otherwise manipulate capacity by generating and deploying new or updating virtual test services 36. For example, in response to receiving input to increase the number virtual test services 28, the virtualization coordinator 56 can instantiate a virtual test service 36 according to the configuration provided by the load-balancing configuration 54.

The virtualization coordinator 56 can also cooperate with the restart module 58 to restart the virtual test services 36. For example, the virtual test services 36 can be reset to clear delayed traffic, to test another application, etc.

The disclosed framework supports testing of multiple applications 16, and the queue manager 60 can be used to control which application 16 has access to the virtualization service 28. In at least some contemplated example embodiments, the queue manager 60 tests each application 16 in sequence, or the queue manager 60 can be used to direct different applications 16 under test to different instances of the virtualization service 28, or the queue manager 60 can be used to direct different applications 16 under test to different instances the virtual test services 36 configured for testing the particular application 16.

Synchronizer 62 can be used to communicate the state of the virtual test services 36, including how each service 36 is configured, the request which generated the virtual test service 36, how to access the virtual test service 36, etc.

Figure 5:
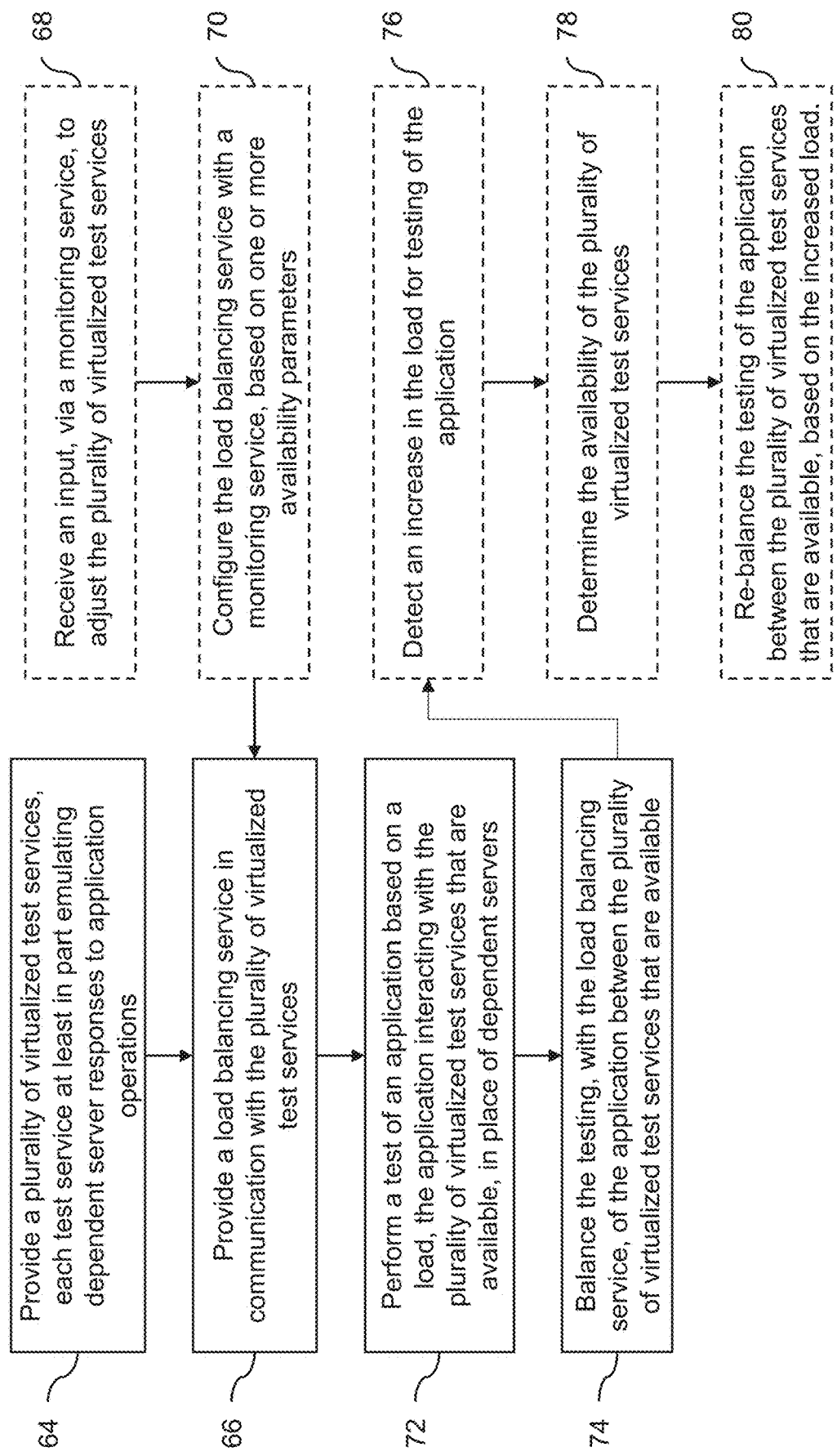
FIG. 5 is a flow diagram of an example of computer executable instructions for application testing.

Referring now to FIG. 5, a flow diagram of an example of computer executable instructions for application testing is shown. The flow diagram will be discussed in relation to the preceding figures. It is understood that the flow diagram is not intended to be limited to the embodiments of the previous figures, and any reference to the preceding figures is illustrative.

At block 64, a plurality of virtual test services 36 are provided. Providing can include initializing the virtual test services 36 based on pre-existing configurations, or training virtual test services 36 to emulate the functionality of dependent resources 34.

Particularizing an example, in a training phase, the application 16 can execute various operations which interact with the dependent resources 34. The responses of the dependent resources 34 can be stored, and aggregated into a virtual test service 36 that emulates the dependent resources 34 responses. In at least some contemplated example embodiments, the training regime is controlled to increase the accuracy or robustness of the virtual test service 36. For example, the application 16 can be operated in the training phase for a minimum duration to ensure that the virtual test service 36 is populated with a sufficient number of responses. In at least some example embodiments, the application 16 is operated in a manner to target certain operations of the dependent resources 34, in order to ensure a robust virtual test service 36.

Each virtual test service 36 at least in part emulates dependent resources 34 responses to application operations. A virtual test service 36 can mimic a single functionality of the dependent resources 34, or a variety of different responses of the dependent resources 34. In example embodiments, the virtual test services 36 are mutually exclusive. In at least some contemplated example embodiments, at least some of the virtual of services 36 overlap one another, at least to a degree. For example, a particular virtual test service 36 can be instantiated multiple times in order to promote parallel execution of different tests for different applications 16.

At block 66, a load-balancing service 26 is provided. The load-balancing service 26 directs the fulfillment of the application 16 operations to the provided virtual test services 36. The load-balancing service 26 is in communication with the virtualized test services (e.g., via a custom API).

The load-balancing service 26 can be, in at least one instance, instantiated with a default configuration based on one or more availability parameters relating to the virtual test services 36. For example, a status file listing capacities and other availability parameters of the instantiated virtual test services 36 can be used to initialize the load-balancing service 26 to enable it to properly balance subsequent application operations. The status file can be updated periodically, or in real time, by, for example, the monitoring service 24.

The status, or the availability parameters on which the load-balancing service 26 relies, can be updated over time. For example, the status can be updated to account for the removal of, or the creation of a new virtual test service 36. In at least some contemplated example embodiments, the status file of the load-balancing service 26 is updated or otherwise manipulated by the monitoring service 24 in response to user input.

For example, at block 68, an input is received, via the monitoring service 24, to update the availability parameters. The monitoring service 24 can process the input and update the status file, resulting in different operation of the load-balancing service 26. In some example embodiments, for example, the input can specify the creation of virtual test services 36, enabling the load-balancing service 26 to spread load across a greater amount of virtual test services 36. Alternatively, the input can specify that a particular virtual test service 36, previously available, is now unavailable or inaccessible (e.g., as a result of access management policies) and should be removed from load-balancing.

In some example embodiments, for example, the input can specify a hierarchy as between the virtual test services 36, or between functionalities of a virtual test service 36. Various different hierarchies are contemplated. For example, more recently developed virtual test services 36 can be preferred where greater accuracy is desired. In another example, the input can specify which functionality of a multi-functional virtual test service 36 should be used or prioritized. In yet another example, the input can specify a priority for virtual test services 36 depending on the nature of the training involved for generating the virtual test service 36 (e.g., virtual test services 36 which have been trained for a longer period of time may be preferred as being more robust, or virtual test services 36 generated from more focused training may be preferred for more focused testing, etc.).

At block 70, the load-balancing service 26 is configured based on the input received via the monitoring service 24. In example embodiments, where block 70 is performed, the providing outlined in block 66 can include instantiating the load-balancing service 26.

A block 72, a test of the application 16 is performed (e.g., with the load generated by the load generator 32). During testing, application 16 operations which during deployment would interact with dependent resources 34 are instead directed to the virtual test services 36 that are available. In this way, application 16 testing can be decoupled from the dependent resources 34.

The availability of the plurality of virtual test services 36 can be determined with reference to the input discussed in respect of block 68. The availability of the plurality virtualized services 36 can include availability parameters generated by the testing. For example, the availability parameters can include a latency of the individual virtual test services 36, and virtual test services 36 with the latency above a threshold may be deemed to be unavailable. The availability can be determined with reference to the type or operations that the virtual test service 36 emulates. For example, the load-balancing service 26 can be configured with a listing of functionalities of the virtual test services 36, and direct traffic according to the capabilities of the virtual test service 36. The availability of the service can be determined by reference to the location of any hardware implementing the virtual test service 36. For example, regulatory requirements can limit the transmission of data (i.e., operations), and the load-balancing service 26 to be configured to be responsive to same.

At block 74, the load-balancing service 26 balances the testing being performed based on the configuration and/or the determined availability.

Optionally, as shown in blocks 76, 78, and 80, the load-balancing service 26 can be configured to rebalance testing based on increased loading.

At block 76, for example, the monitoring service 24 can detect an increase in the load applied to the application 16. In at least some contemplated example embodiments, the increased load can result from user input to the monitoring service 24 to control the load generator 32 and increase the applied load (e.g., a developer user can increase the load applied during the test). The increase in load can be detected during an ongoing test of the application 16.

A block 78, the availability of the virtual test services 36 is determined. In example embodiments, the availability can include whether the user requesting the testing has access to the virtual test service 36. In yet another example, the availability can be determined as discussed in respect of block 72. In yet a further example, the availability can be determined based on new input into the monitoring service 24 (e.g., a developer user can update the capacity of an existing virtual testing service 36, create new virtual test service 36, or maintain an existing virtual test services 36, etc., to facilitate the increased load).

At block 80, the load-balancing service 26 rebalances the testing of the application 16 between the virtual test services 36 that are available, based on the increased load.

In this way, a developer user of the present disclosure can determine to increase loading applied to the application 16 during testing, and initialize virtual test services 36 to facilitate the increased load. This increase loading can be applied notwithstanding the availability of the dependent resources 34, and the disclosure contemplates the developer user being able to dynamically create virtual test services 36 on available resources (e.g., as opposed to scheduling the dependent resources 34). This can allow developer user flexibility to implement rapid and responsive testing, for example allowing monitoring of the available resources, and adjusting testing a particular application 16 to take advantage of perhaps unexpectedly available resources.

The manipulation of the load-balancing service 26 or the virtual test services 36 can be accomplished via a graphical user interface (GUI) generated by the monitoring service 24.

Figure 6:
FIG. 6 is an image of a user interface for receiving inputs to manipulate virtualized testing services.

FIG. 6 is an image of an example GUI 81 for receiving inputs to manipulate virtualized testing services.

The GUI 81 includes a list of virtual test services 82 (denoted by virtual service 82a to 82n), listing a name 84 of each virtual test service 82, and parameters, such as the employed protocol 86, and the port number 88 to facilitate communication with and manipulation of the virtual test service 82. The GUI 81 further includes an indication 90 of the capacity of the virtual test service 82, allowing for determining potential availability at a glance when considering increasing loads on existing testing of the application 16.

The GUI 81 also includes an indication 92 of the date in which the virtual test service 82 is created. The indication 92 can allow a user to select more recent virtual test services 36, which are more likely to be accurate. Relatedly, the indication 92 can indicate to a user whether a virtual test service 82 is required to be updated.

The GUI 81 includes one or more elements 94 for manipulating the availability of the virtual test service 82. In the shown embodiment, the elements 94 include a first element 94a, for changing any of the indications or other parameters of the virtual test services 82. For example, although not shown, the first element 94a can be used to retrain a virtual test service 82 to increase the capacity, reassign the port number, change the protocol for communication, etc. The second element 94b can remove virtual test services 82 from consideration for application 16 testing. The third element 94c can at least temporarily suspend the availability of virtual test services 82.

In at least some contemplated example embodiments, the virtual test services 82 and/or the GUI 81 are provided to, or accessible to, a plurality of user accounts. For example, an application testing team can use the GUI 81 to communally share the available virtual test services 82. In this respect, the ability to repurpose virtual test services 82 (e.g., to retrain for greater robustness in emulating existing functionalities, to change capacities, to change communication protocols, etc.) facilitates a reduction in maintenance required for testing application 16. Similarly, the GUI 81 can serve to enable relatively rapid assessment of capacity and sharing of the available virtual test services 36. For example, users may temporarily lock or make unavailable virtual test services 82 which are expected to be utilized, or are being utilized for an application 16 test.

Figure 7:
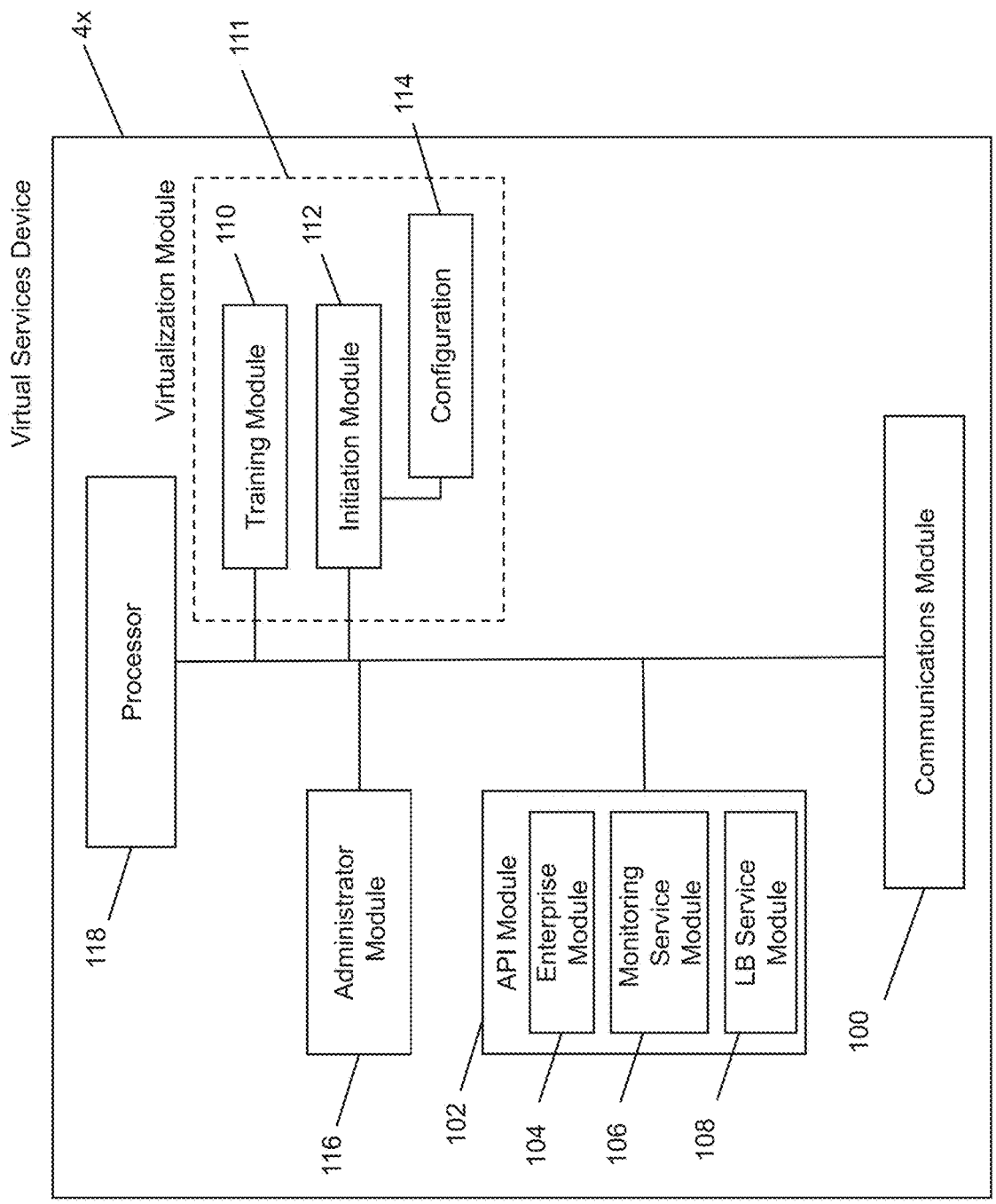
FIG. 7 is a block diagram of an example configuration of a device for providing virtual services.

FIG. 7 is a block diagram of an example configuration of a device 4x for providing virtual test services.

The device 4x includes one or more communications modules 100 (hereinafter referred to in the singular, for ease of reference) that enables the device 4x to communicate with one or more other components of the computing environment 2, such as devices within the application testing environment 14 or application development environment 12, via a bus or other communication network, such as the communication network 10. While not delineated in FIG. 7, the device 4x includes at least one memory or memory device that can include a tangible and non-transitory computer-readable medium having stored therein computer programs, sets of instructions, code, or data to be executed by one or more processors (not shown for clarity of illustration), FIG. 7 illustrates examples of hardware and datastores/databases operable within the device 4x, however, it can be appreciated that any of the components shown in FIG. 7 may also be hosted externally and be available to the device 4x, e.g., via the communications module 100.

In the example embodiment shown in FIG. 7, the device 4x includes an API module 102 to facilitate communication with, or obtain access to, or obtain instructions (e.g., a configuration) from other services within the computing environment 2, such as the load-balancing service 26 or the monitoring services 24, etc. The API module 102 can include dedicated submodules, such as the shown enterprise API module 102 (e.g., for facilitating communication with other devices within the enterprise 6), the monitoring service module 106 (e.g., for facilitating communication with the monitoring service 24), and the load-balancing service module 108 (e.g., for facilitating communication with the load-balancing service 26). Having separate dedicated API modules can facilitate continuous integration and continuous delivery, enabling consistent and updatable communication between the various services.

The shown device 4x includes the virtualization module 111 for generating virtual test services 36, and can include the training module 110, and the initialization module 112. The training module 110 can facilitate the configuration of the virtual test services created by the virtualization module 111. For example, the training module 110 can include listings of dependencies between dependent resources 34 and application 16 so as to facilitate the training of new virtual test services 36. The initialization module 112 can be used to create virtual test services 36, for example, based on a configuration 114. Grading the virtual test service 36 can include for example assigning a port to the virtual test service 36, etc.

Although not shown in FIG. 7, as noted above, the device 4x may also include a cryptographic server for performing cryptographic operations and providing cryptographic services. The cryptographic server can also be configured to communicate and operate with a cryptographic infrastructure. The device 4x may also include one or more data storage elements for storing and providing data for use in such services, such as data storage for storing an encrypted configuration 114.

The configuration 114 can include, in an example embodiment, mock or real data that is collected during a training phase of the virtual test service 36.

The administrator module 116 supports configuration of the device 4x. For example, the device 4x can be configured to avoid communication with dependent resources 34 during testing. The administrator module 116 can specify operating parameters of one or more processor(s) 118 needed to perform the functionality of the device 4x (e.g., limit performance to maintain a processor 118 temperature, direct which processor performs certain tasks, etc.). The administrator module 116 can also support interactions with other applications having access to the virtual test services 36, or between other applications of the load-balancing service 26, or the monitoring service 24. For example, the administrator module 116 can support interactions with a mobile application, or a web application, etc.

Figure 8:
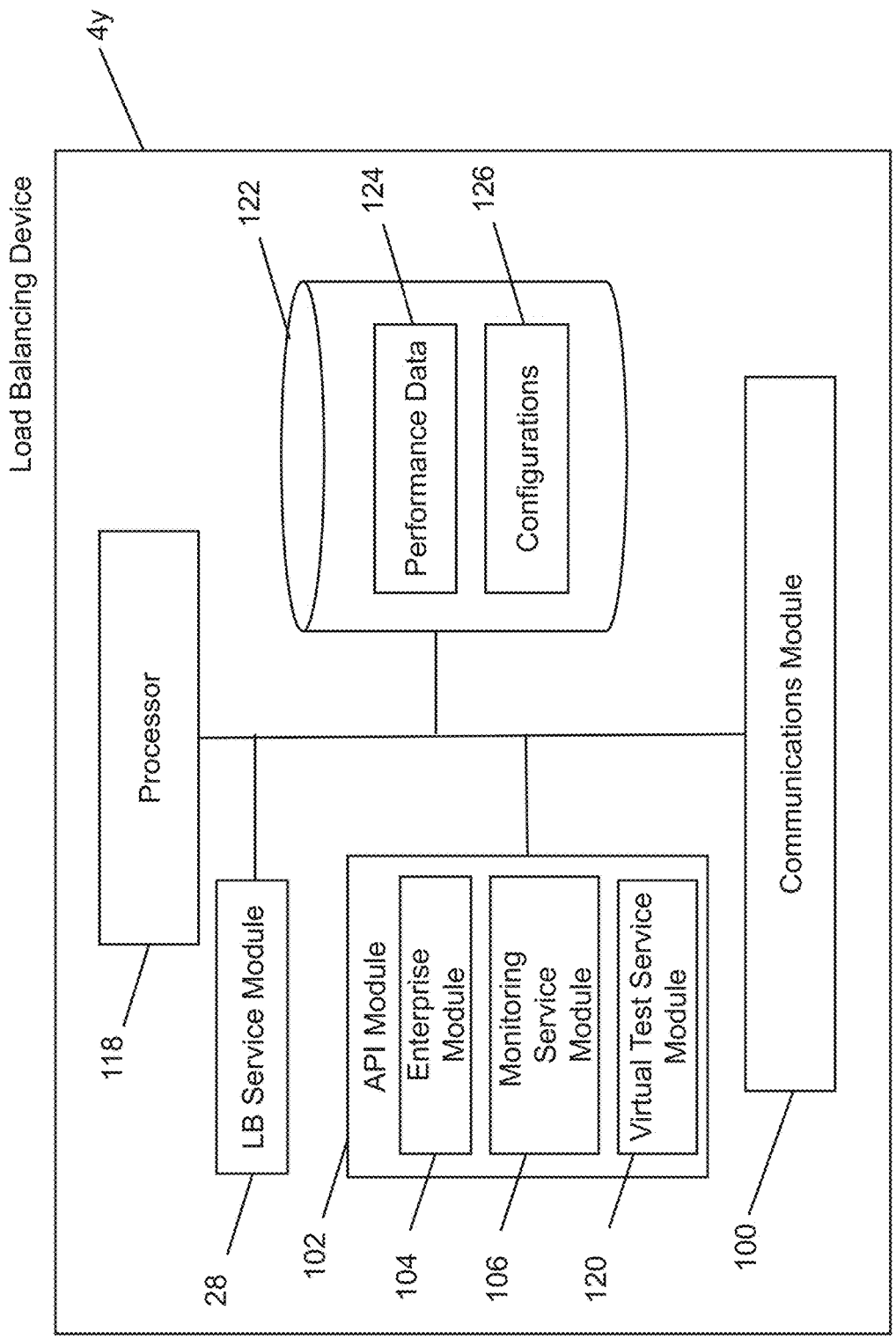
FIG. 8 is a block diagram of an example configuration of a device for providing load-balancing services.

FIG. 8 is a block diagram of an example configuration of a device 4y for providing load-balancing services.

The device 4y, similar to device 4x, includes the communications module 100, at least one memory or memory device (not shown) that can include a tangible and non-transitory computer-readable medium having stored therein computer programs, sets of instructions, code, or data to be executed by one or more processors 118, the one or more processors 118, a cryptographic module, and the API module 102. The API module 102 of device 4y includes a virtual test service module 120, to facilitate communication with virtual test services 36. The device 4y also includes a database 122 for storing information to enable the load-balancing service 26 to operate. For example, the database 122 can include data 124 related to the performance of the virtual test services 36 operating on the device 4x (e.g., a latency for each virtual test service 36, assigned tasks to each of the virtual test service 36, etc.). The database 122 can also include data 126 delineating the configuration of each virtual test service 36 to enable accurate load-balancing. For example, the data 126 can include the availability data of each virtual test service 36, the functions performed by each virtual test service 36, etc. Data 126 can be different from the configuration 114 of the device 4x in that the configuration 114 can include all information required to initialize the virtual test service 36, where the data 126 is limited to metadata and other information required to perform the load-balancing.

Figure 9:
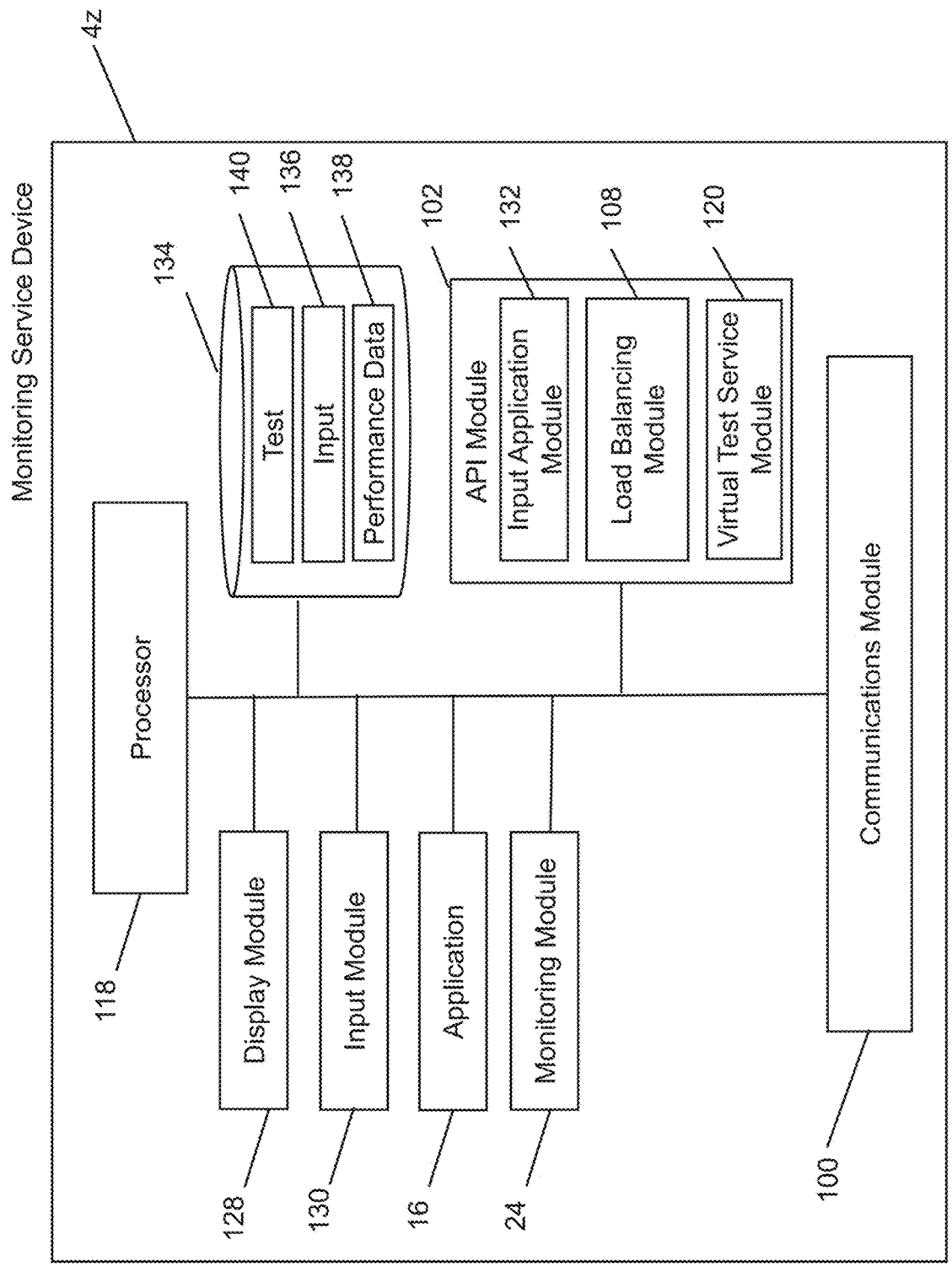
FIG. 9 is a block diagram of an example configuration of a device for providing monitoring services.

FIG. 9 is a block diagram of an example configuration of a device 4y for monitoring services.

Similar to FIGS. 7 and 8, the device 4y can include an API module 102, a communications module 100, one or more memories or memory devices, a cryptographic module, and one or more processors 118.

The device can also include the monitoring module 24, and the application 16 for testing, which may be stored as the statement described herein. In example embodiments, not shown, the application 16 under test is transmitted via the monitoring service device 4z to the other devices in order to enable testing of the application 16 (e.g., the application 16 can be instantiated on separate devices in order to facilitate parallel testing).

The device 4z, in the shown embodiment, includes a display module 128 for rendering GUIs and other visual outputs on a display device such as a display screen, and an input module 130 for processing user or other inputs received at the device 4z, e.g., via a touchscreen, input button, transceiver, microphone, keyboard, etc. The device 4z may also include an application 16 to be tested that includes the latest application build data (e.g., stored on database 134 as test data 140 to facilitate testing of the application 16) to be tested using or in coordination with the device 4z.

The database 134 initial embodiment includes performance data 138 relating to the testing. For example, the data 138 can include data related to each of the virtual testing services 36, such as a latency of the virtual test service 36, metadata related to the testing, such as a status of the testing, etc. The test data 140 can include the application 16 under test, and various parameters outlining the testing. For example, the data 140 can include parameters defining schedule testing, and amount of load to be applied during testing, the types of functions of the application 16 which are being tested, etc.

The database 134 can also store data 136 input (e.g., via the input module 130), by the user device 4. As described herein, the user device 4 can manipulate configurations of the load-balancing service 26 or the virtual test service 36, and the data 136 can be used to store the inputs themselves, and metadata related to the input (e.g., the request for the manipulation, the date the input what was received, etc.).

The device 4z is also shown including an input application module 132 within the API module 102. The input application module 132 can be used to facilitate access or communication with a device 4 operated by a user device 4. For example, input application module 132 can be a web application module to support interactions between a website accessed by a web browser application running on a user device 4 device and the device 4z. It can be appreciated that the input application module 132 can support various front ends for the same application, that is, the mobile (app) and web (browser) versions of the same application. It is noted that the input application module 132 can support interactions with a plurality of applications for receiving input, and can include, for example, an application imitating the functionality of the enterprise module 104.

Each device can include a data store (not shown in the example of the virtual test service device 4x), that may be used to store device data, such as, but not limited to, an IP address or a MAC address that uniquely identifies the device. The data stores may also be used to store various data ancillary to performing the testing of application 16, such as, but not limited to, login credentials, user preferences, cryptographic data (e.g., cryptographic keys), etc.

It will be appreciated that only certain modules, applications, tools and engines are shown in FIGS. 4, and 7 to 9 for ease of illustration and various other components would be provided and utilized by the application testing environment 14, application development environment 12, and devices 4, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the application testing environment 14, application development environment 12, enterprise system 6 or devices 4, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for testing applications, the system comprising:
   one or more processors;
   one or more communications modules coupled to the one or more processors to enable communications between services provided by the system; and
   at least one memory coupled to the one or more processors, the at least one memory storing computer executable instructions that when executed by the one or more processors cause the system to:
   enable at least one virtualized test service, each virtualized test service at least in part emulating dependent server responses to application operations; and
   test an application based on a load, by directing the application to interact with an available one of the at least one virtualized test service, while avoiding communicating with the dependent servers during testing, wherein one or more of the at least one virtualized test service is configured during a training period based on responses from the dependent servers to the application.

2. The system of claim 1, wherein the instructions, when executed by the one or more processors, cause the system to:
   enable a plurality of virtualized test services;
   enable a load balancing service for communicating with the plurality of virtualized test services; and
   have the load balancing service balance the testing of the application between available ones of the plurality of virtualized test services.

3. The system of claim 2, wherein the instructions, when executed by the one or more processors, cause the system to:
   enable a monitoring service to communicate with the load-balancing service; and
   wherein the monitoring service configures the load-balancing service with one or more parameters determining availability of the plurality of virtual testing services.

4. The system of claim 3, wherein the one or more parameters determining availability comprise at least one of a latency of at least one of the plurality of virtualized testing services, a service type of the plurality of virtualized testing services, a user input indicating unavailability, and a location of at least one of the plurality of virtualized testing services.

5. The system of claim 3, wherein the monitoring service and the load-balancing service are each on separate dedicated servers relative to the plurality of virtualized test services that are available.

6. The system of claim 3, wherein the instructions, when executed by the one or more processors, cause the system to generate a user interface, via the monitoring service, for receiving input to manipulate the availability of the plurality of virtualized test services.

7. The system of claim 3, wherein the instructions, when executed by the one or more processors, cause the system to generate a user interface, via the monitoring service, for at least one of creating, deploying, and maintaining virtual test services.

8. The system of claim 3, wherein the monitoring service aggregates performance information from the plurality of virtual test services for consumption, and wherein the monitoring service displays the aggregated information.

9. The system of claim 1, wherein a configuration file for one or more of the at least one virtualized test service is stored for subsequent testing.

10. The system of claim 1, wherein one or more of the at least one virtualized test service is initialized with a pre-existing configuration file.

11. The system of claim 1, wherein the instructions, when executed by the one or more processors, cause the system to:
    detect an increase in the load for testing of the application;
    determine the availability of the at least one virtualized test service; and
    re-balance the testing of the application between available ones of the at least one virtualized test service, based on the increased load.

12. The system of claim 11, wherein the increase in the load is detected during an ongoing test of the application.

13. A method for testing applications, the method comprising:

enabling at least one virtualized test service, each test service at least in part emulating dependent server responses to application operations;

providing a load-balancing service in communication with the plurality of virtualized test services; and testing an application based on a load, by directing the application to interact with an available one of the at least one virtualized test service, while avoiding communicating with the dependent servers during testing, wherein one or more of the at least one virtualized test service is configured during a training period based on responses from the dependent servers to the application.

14. The method of claim 13, further comprising:

enabling a plurality of virtualized test services;

enabling a load balancing service for communicating with the plurality of virtualized test services; and having the load balancing service balance the testing of the application between available ones of the plurality of virtualized test services.

15. The method of claim 14, further comprising configuring the load-balancing service, via a monitoring service in communication with the load-balancing service, with one or more parameters determining availability of the plurality of virtual testing services.

16. The method of claim 15, wherein one or more parameters determining availability comprise at least one of a latency of at least one of the plurality of virtualized testing services, a service type of the plurality of virtualized testing services, a user input indicating unavailability, and a location of at least one of the plurality of virtualized testing services.

17. The method of claim 13, further comprising storing a configuration file for one or more of the at least one virtualized test service for subsequent testing.

18. The method of claim 13, further comprising:

detecting an increase in the load for testing of the application;

determining the availability of the at least one virtualized test service; and re-balancing the testing of the application between available ones of the at least one virtualized test service, based on the increased load.

19. A non-transitory computer readable medium for testing applications, the computer readable medium comprising computer executable instructions for:

enabling at least one virtualized test service, each test service at least in part emulating dependent server responses to application operations;

providing a load-balancing service in communication with the plurality of virtualized test services; and testing an application based on a load, by directing the application to interact with an available one of the at least one virtualized test service, while avoiding communicating with the dependent servers during testing, wherein one or more of the at least one virtualized test service is configured during a training period based on responses from the dependent servers to the application.

* * * * *